Patented Jan. 14, 1930

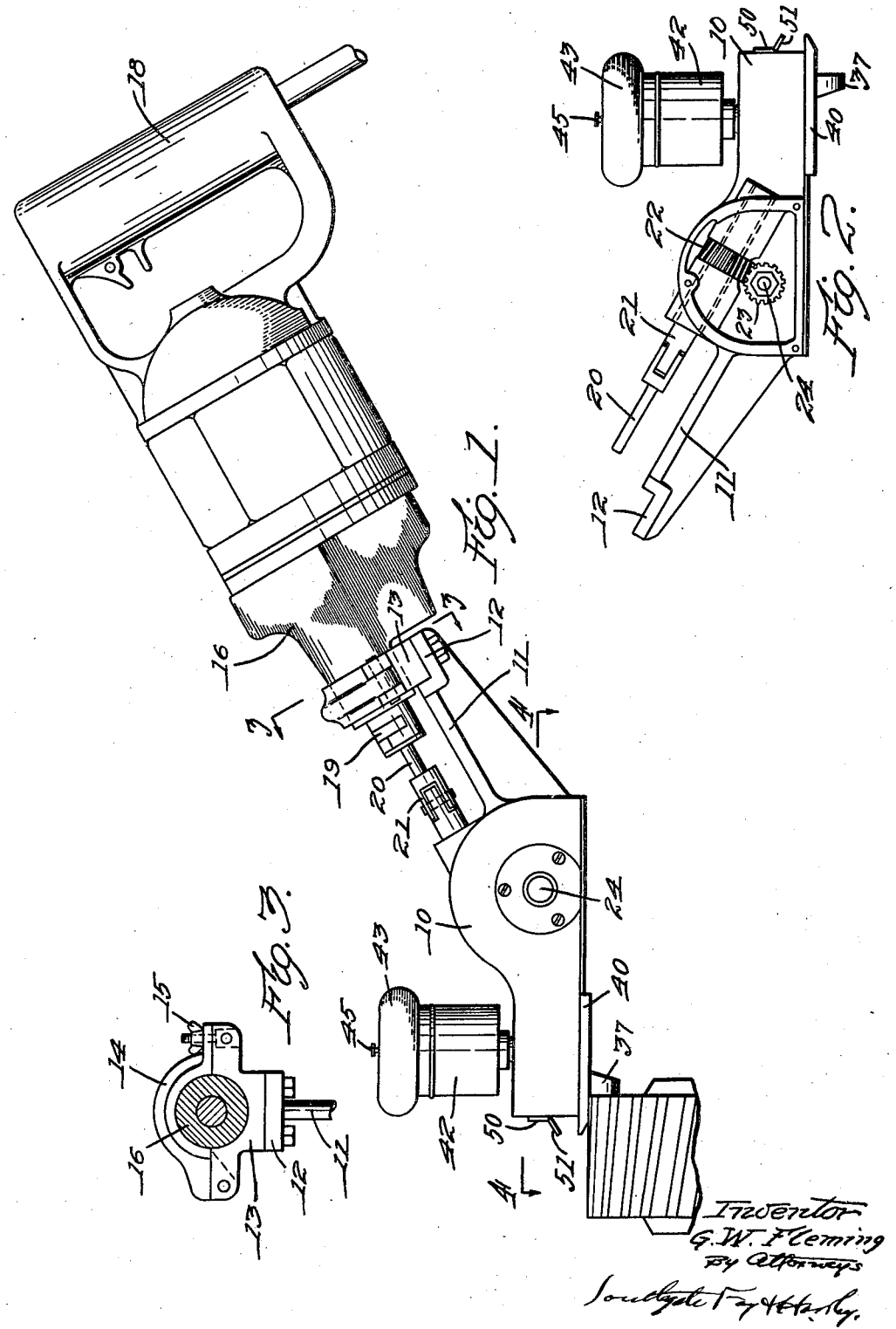

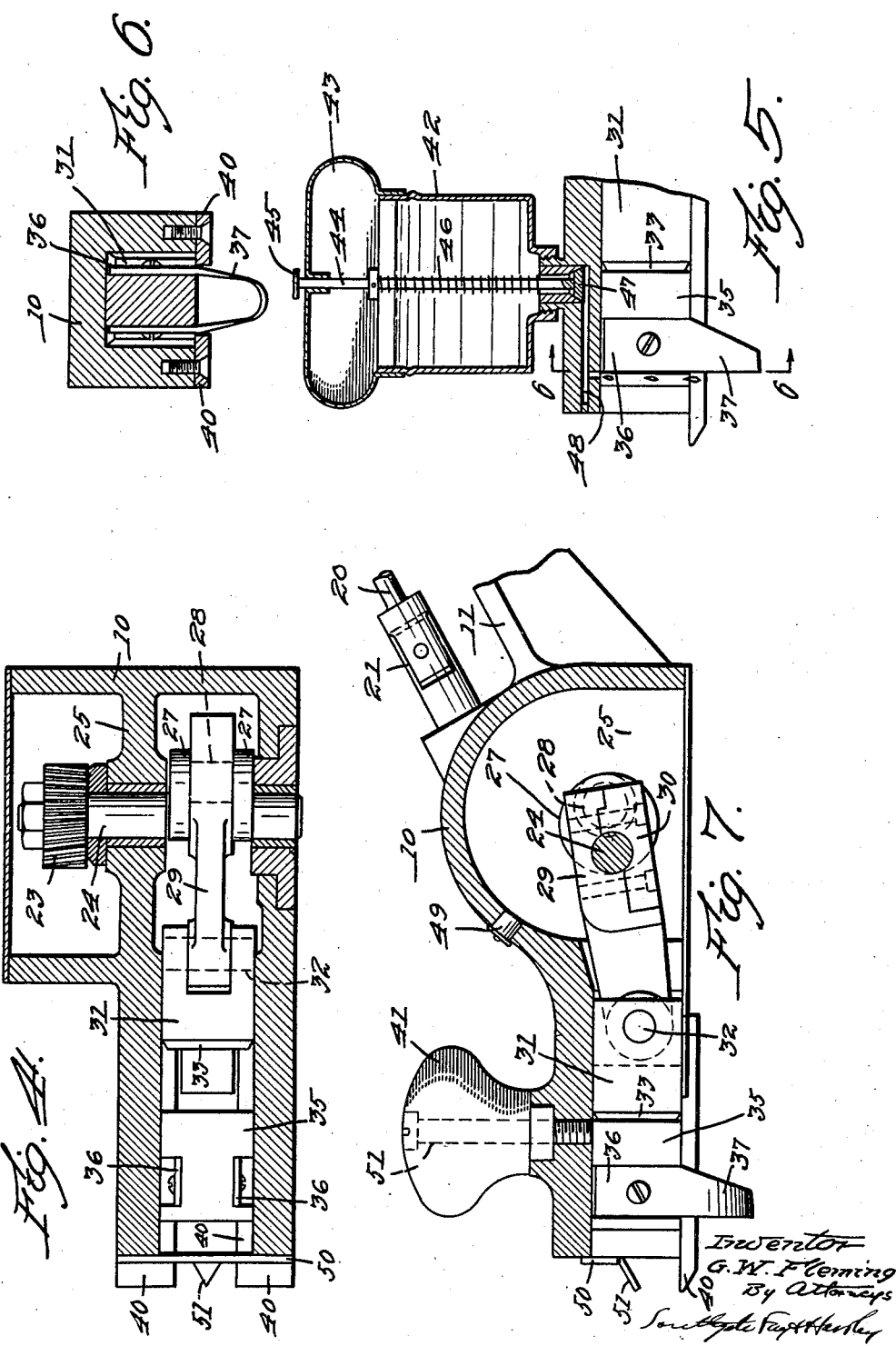

1,743,125

UNITED STATES PATENT OFFICE

GEORGE W. FLEMING, OF WORCESTER, MASSACHUSETTS, ASSIGNOR TO FLEMING MACHINE COMPANY, OF WORCESTER, MASSACHUSETTS, A CORPORATION OF MASSACHUSETTS

PORTABLE DEVICE FOR REGROOVING SOLID TIRES

Application filed April 30, 1926. Serial No. 105,389.

This invention relates to a tool adapted to be attached to and operated by an ordinary portable electric drill or other power operated tool for the purpose of effectively regrooving worn solid tires.

The principal objects of the invention are to provide convenient means for readily attaching the tool to and detaching it from a portable tool; to provide a rapid and simple means for regrooving tires that will be easy to manipulate, save the time of the operator and improve the product; to provide a simple driving arrangement which will be connected with the spindle of the portable power operated tool when that is assembled therewith for imparting to the cutting tool a series of blows to constitute a hammering action; to provide a casing for the cutting tool and the hammer operating means that will constitute a solid frame work and enclosure therefor; to provide this casing with a guide for resting on the tire and controlling the depth of the cut; to provide a cutting tool slidably mounted in the casing and fixed on a block adapted to receive the blows of the hammering device; and especially to provide an improved cutting tool which is of a construction that renders it capable of readily cutting out a groove in the rubber surface and which has means for fixing it to said block.

The invention also involves in one form, a hand-grip on the tool for guiding it, in conjunction with the electric tool, which hand-grip can be formed as a reservoir for soda water or other lubricating liquid and having means for feeding the same in front of the tool as desired.

Other objects and advantages of the invention will appear hereinafter.

Reference is to be had to the accompanying drawings in which

Fig. 1 is a side view of the complete tool constructed in accordance with this invention, showing the electric drill attached thereto in position for operating it and showing its relative position to the tire when the cutting or grooving operation is started;
Fig. 2 is a side view of the opposite side of the tool itself showing it detached from the electric drill;

Fig. 3 is a sectional view along the line 3—3 of Fig. 1;

Fig. 4 is a horizontal sectional view on the line 4—4 of Fig. 1;

Fig. 5 is an enlarged longitudinal sectional view along the center of the tool;

Fig. 6 is a sectional view on the line 6—6 of Fig. 5; and

Fig. 7 is a sectional view similar to Fig. 5 but showing a solid hand grip instead of the lubricating arrangement.

Heretofore it has been the custom to groove solid tires after they had been worn so as to present new surfaces having substantially the characteristics of the original circumference of the tire, generally in the form of angularly disposed grooves. Such grooves have been formed before by providing a tool of proper shape, holding it in position, and then hammering on the tool to drive it through the rubber. The devices that have been used for this purpose are crude as far as I am aware.

This invention is designed to produce a tool that will accomplish the usual objects effectively and at the same time provide it with a portable drill motor for operating it to eliminate the use of a hand operated implement for hammering on the cutting tool, and also to provide a more accurate device which will be guided in the proper path without necessitating so much skill and labor on the part of the user.

For this purpose I have provided a tool having a casing 10 from which is a projecting ledge 11, having a rest 12 thereon. On this rest is fixed a stand 13 having a bottom which is supported by the rest 12. This stand is provided with a pivoted cover 14 and thumb nut arrangement 15 for holding it down around the bottom of the frame 16 of a power operated tool such as an electric drill, thus clamping the drill thereto. This drill has a handle 18 of any usual construction and is provided with a motor operating a tool chuck 19. This chuck is located beyond the casing 16 at the lower end and when the stand 13 is in proper position and secured to the rest 12 by bolts or screws, the two casings described are fixedly secured together so that they can be manipulated as one tool.

A spindle 20 is secured in the chuck. This spindle is connected with a shaft 21 which may be considered as a part of the grooving tool as it is left in position when the electric drill is removed. They are shown connected by a well known form of joint. The shaft 21 is provided with a spiral gear 22 meshing with a similar gear 23 on a cross shaft 24 mounted in bearings in the frame 10.

The frame 10 is divided into two compartments by a partition 25 and the gear 23 is located in the outer one beyond this partition. The shaft 24 is supported in bearings in this partition and on the opposite outer wall so that it is accurately supported at two points at a distance apart.

In the chamber through which this part of the shaft passes, the shaft is provided with two arms 27 between which is an eccentric pin 28. This pin is mounted in semi-circular recesses, formed in an arm 29 and a block 30 which is secured to it and constitutes a part thereof. This arm 29 constitutes a driving rod for a hammer 31 being connected with it by a stud 32. This hammer is provided with a steel end 33 or may be of steel throughout. It is guided to move longitudinally in a straight passage in the casing 10.

It will be obvious that as the spindle of the pneumatic or electric tool rotates at a high speed the hammer 31 will be reciprocated at a very high speed. Also in the passage in which the hammer reciprocates is loosely mounted a solid block 35 on the opposite side of which are secured the ends 36 of a cutter 37. This cutter is of a U-shaped form, and its ends 36 are integral with it, being secured to the opposite sides of the block 35, the whole thing constituting a unitary structure. Therefore, although this block may not actually reciprocate, it is affected by the blows of the hammer 31 and as the whole tool is forced forward by the operator, it serves the purpose.

This U-shaped cutter or knife is very efficient for this purpose and is held firmly as stated. The block is positively guided in the passage in the casing 10 and is held back against the hammer by the force applied by the operator.

On the casing are secured at the bottom two plates 40. These project beyond the end of the casing and serve as a rest for the tool before the operation starts. Thus it can be guided on the surface of the tire along what is left of the old grooves in the rubber to assist the operator in producing the new grooves in exactly the same place and at the same slant.

In using the device, the operator grasps it with both hands, the right hand holding the handle 18 and the left hand holding a hand-grip 42. It is preferred that this hand-grip be formed as a receptacle for holding a liquid lubricant, soda water or the like, suitable for use in cutting rubber. In this case, the receptacle 42 is provided with a cover 43 which the operator grasps to guide the tool. It is also provided with a plunger 44 with a head 45 which can be forced down to compress a spring 46 and open a valve 47. This lets the liquid drop down to a groove 48 and down in front of the cutting tool 37. The parts in the casing may be oiled through an opening 49.

On the front of the instrument is a plate 50 having a triangular projection 51 extending downwardly from it at an angle, and also serves as a guide at the beginning of the operation of the tool. In the form shown in Fig. 7 a solid hand-grip 41 is shown fixed in place by a bolt 51. This constitutes a very simple device for this purpose and accomplishes the above mentioned objects. It is capable of being used anywhere where portable electric drills are provided.

Although I have illustrated and described only two forms of the invention, I am aware of the fact that other modifications can be made therein by any person skilled in the art without departing from the scope of the invention as expressed in the claims.

Therefore I do not wish to be limited to all the details, but what I do claim is:—

1. In a grooving device for regrooving solid rubber tires, the combination with a casing having a longitudinal guideway therein, of a block mounted loosely in said guideway, and a grooving tool comprising a U-shaped cutting portion and two side portions secured to the opposite sides of the block.

2. In a tire grooving tool, the combination with a casing, a partition across it dividing it into two compartments, a shaft supported in one side wall and in the partition, a shaft in the casing, means on the shaft for driving the first named shaft and projecting from the casing into a position to be driven, a motor mounted on the casing for driving the second shaft, an eccentric pin on said shaft in the other compartment of the casing, a tire grooving tool carried by the casing, and means connected with said eccentric pin for imparting the vibration to the tire grooving tool.

3. In a machine for grooving soft materials, the combination of a casing, a hand-grip at its forward end, a grooving tool held in said casing and projecting from the bottom thereof, and a hammer reciprocable in the casing for imparting rapid impacts to the grooving tool, a portable power operated tool having a handle, and means for operating the hammer by the portable tool, said tool being mounted on the casing in a position for said handle to constitute, with said hand-grip, means for manipulating the casing.

4. In a device of the character described, the combination of a casing, a grooving tool projecting therefrom, an arm carried by the casing, a drill fixed on said arm and having a spindle projecting toward the casing, a shaft on the casing, means on the shaft for connecting it with said spindle, and means in the casing operated by said shaft for imparting a rapid series of impacts to the grooving tool.

5. In a machine of the character described, the combination of a casing having an arm projecting therefrom at one end, a power operated tool, means on said arm for securely holding the power operated tool on said arm, a shaft supported by the casing adapted to be driven by the tool, a grooving tool carried by and projecting from the casing at the opposite end and connected with the shaft to be driven thereby, and a hand-grip on the power tool constituting means for manipulating the device.

6. The combination with a power operated tool and a tire grooving machine, of a grooving tool, a collar for receiving the tool, a casing having a rest, means for securing said collar to the rest to hold the tool on the casing, and means in the casing for imparting impacts to the grooving tool and adapted to be operated by the power operated tool.

7. In a machine for grooving tires, the combination with a casing, a grooving tool carried thereby, means for imparting impacts to the grooving tool in rapid succession, and guides on the casing for supporting and guiding the tool on the surface of the tire, of a hand-grip on the front of the casing for use in guiding the casing, said hand-grip being hollow, and means for supplying lubricant to the tool.

In testimony whereof I have hereunto affixed my signature.

GEORGE W. FLEMING.